Figure 1:
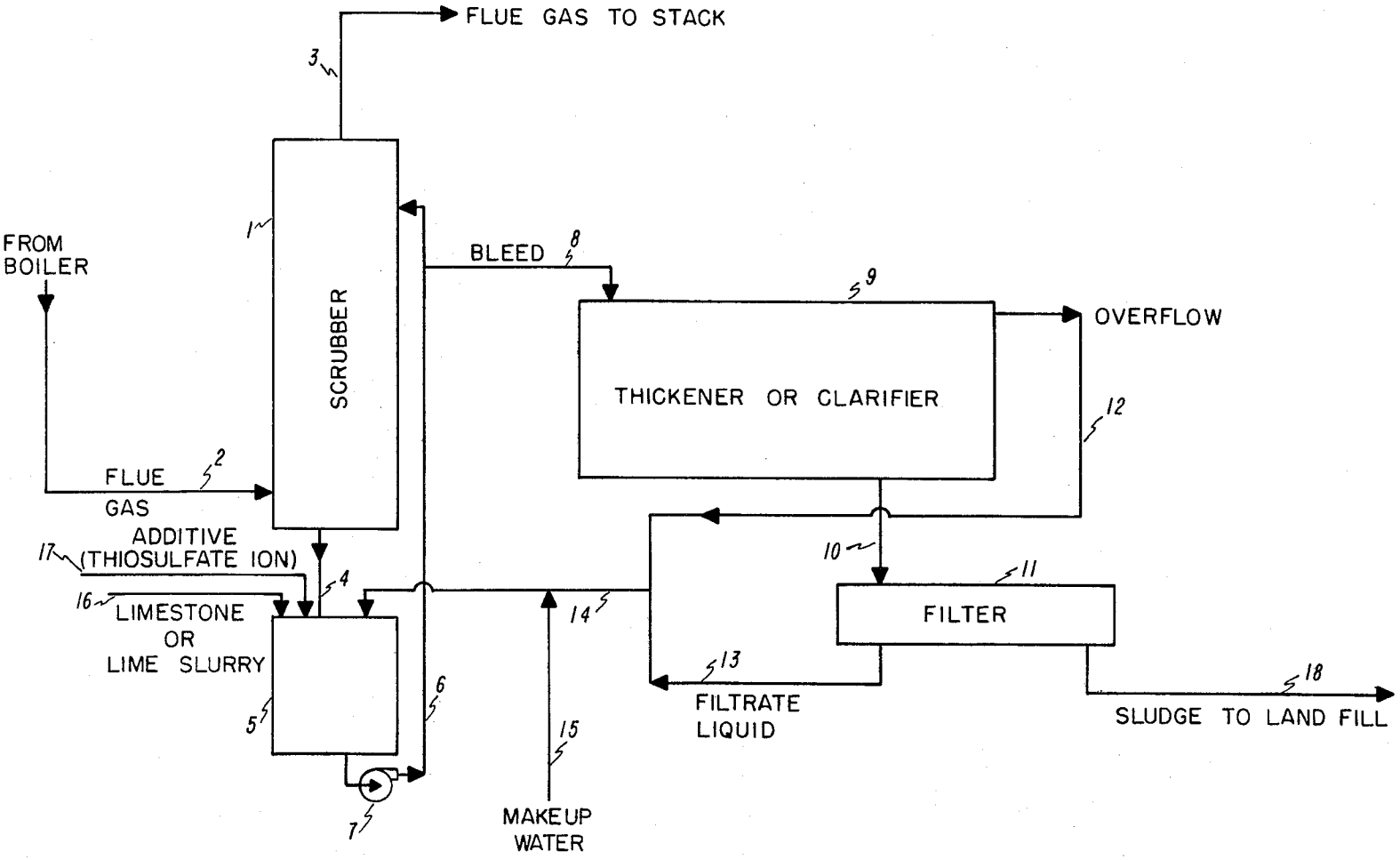
Figure 2:
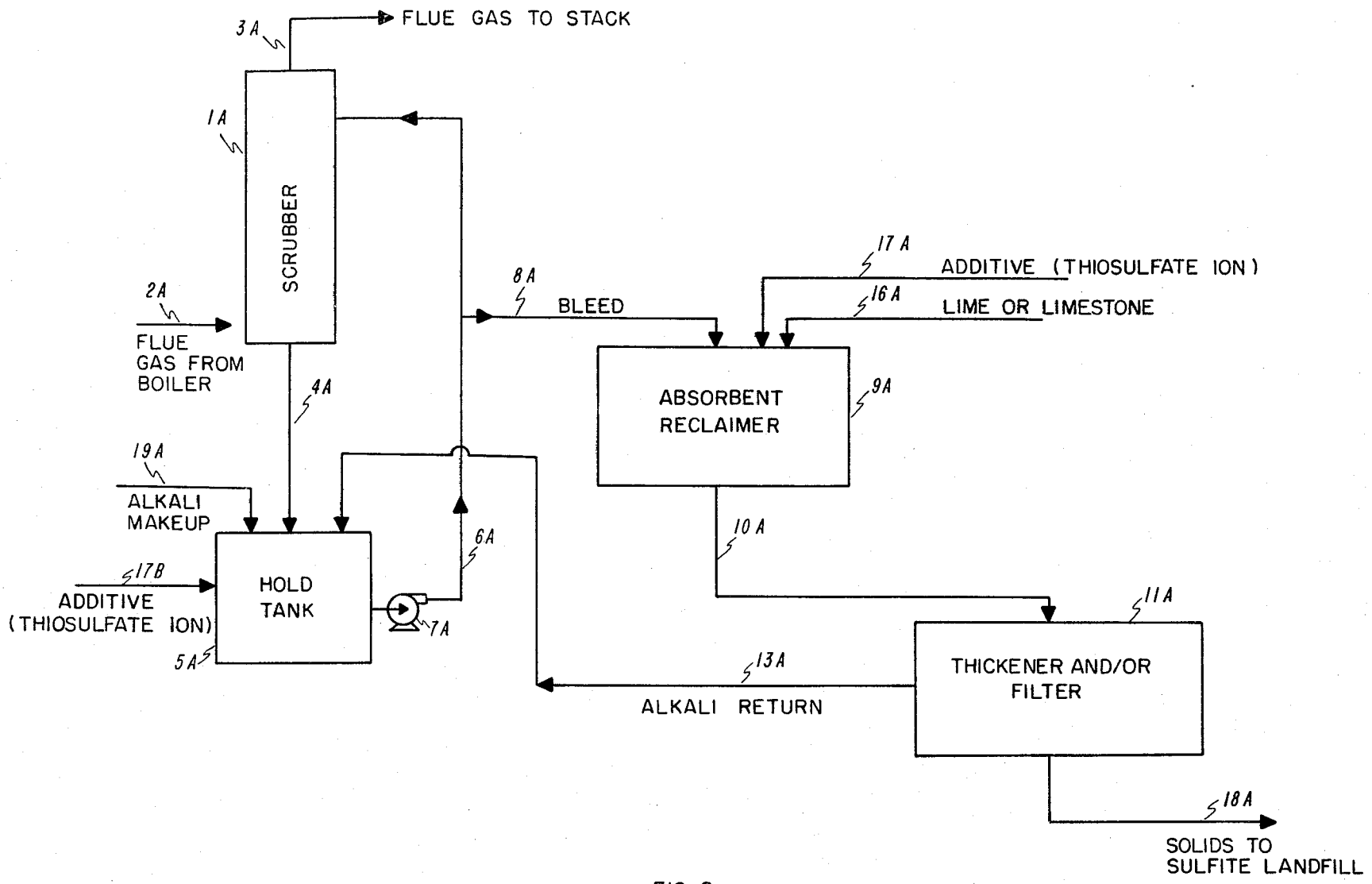
Figure 3:
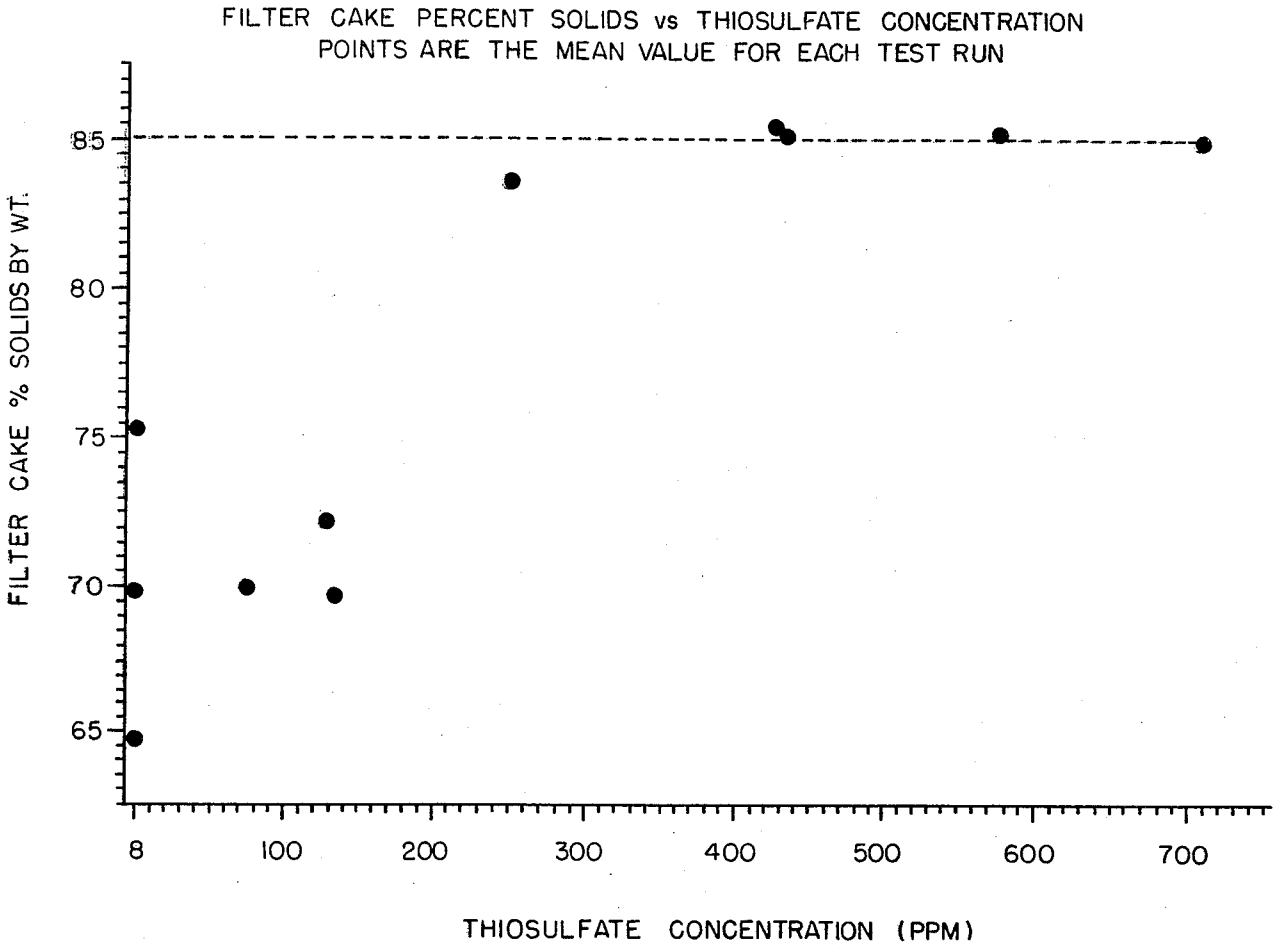
Figure 4:
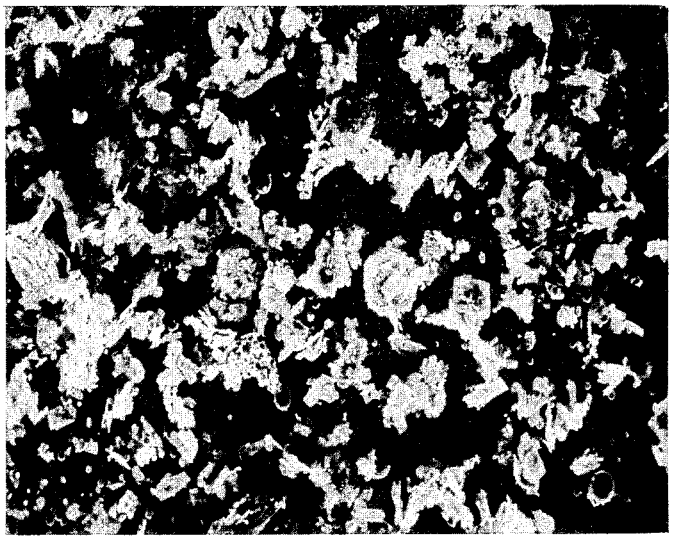
Figure 4:
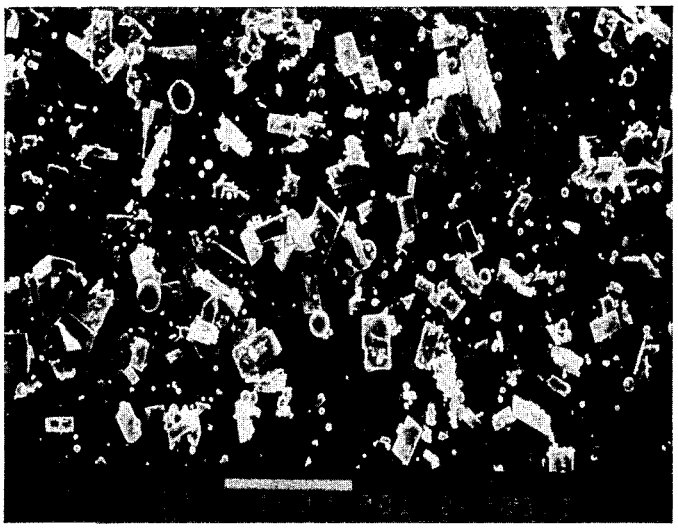
Figure 5:
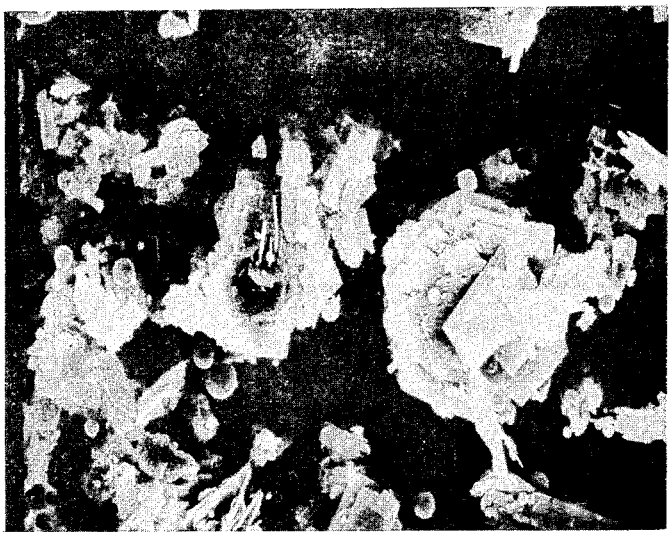
Figure 5:
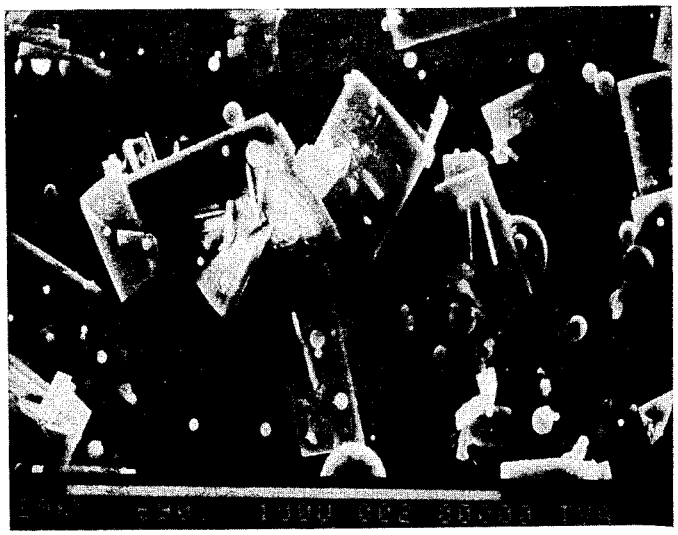

United States Defensive Publication [19] (H) [11] T103,501

Garrison et al. [43] Oct. 4, 1983

[54] DEWATERING OF FLUE GAS DESULFURIZATION SULFITE SOLIDS

[76] Inventors: Forrest C. Garrison, 510 Central Dr., Apt. 514-A, Chattanooga, Tenn. 37421; William L. Wells, 3522A Taft Hwy., Signal Mountain, Tenn. 37377

[21] Appl. No.: 444,127

[22] Filed: Nov. 24, 1982

[51] Int. Cl.[3] ..... C01B 17/00

[52] U.S. Cl. ..... 423/242; 423/512 A; 423/514

[57] ABSTRACT

The dewatering capabilities of sulfite sludges from flue gas desulfurization facilities are substantially improved by the addition of relatively small amounts of sodium thiosulfate additive, or additives derived from or related to sodium thiosulfate, into the scrubber slurry liquor. As an added embellishment, these predetermined amounts of said additives are greater than those required for effecting substantial scale inhibition in the scrubber innards. Subsequently, conventional dewatering of the sulfite sludge to about 80 to 90 percent solids directly produces a waste product disposable in both an economically and an environmentally acceptable manner, in that the thixotropic characteristics of such sludges which are associated therewith upwards to about 70-percent solids therein are completely eliminated.

20 Claims, 5 Sheets Drawing,

31 Pages Specification

The file of this unexamined application may be inspected and copies thereof may be purchased (849 O.G. 1221, Apr. 9, 1968).

FLUFFY AGGLOMERATES OF MICACEOUS CALCIUM SULFITE HEMIHYDRATE CRYSTALS
(200 X)

MONOCRYSTALLINE PARTICLES OF CALCIUM SULFITE HEMIHYDRATE
(200 X)

POROUS LAMELLAR AGGREGATES OF RANDOMLY ORIENTED MICACEOUS CRYSTALLITES OF CALCIUM SULFITE HEMIHYDRATE WITH ASSOCIATED SPHERICAL FLY ASH
(700 X)

TABULAR PRISMATIC SINGLE CRYSTALS OF CALCIUM SULFITE HEMIHYDRATE WITH ASSOCIATED SPHERICAL FLY ASH
(700 X)